US008935908B2

(12) United States Patent
Surmann et al.

(10) Patent No.: US 8,935,908 B2
(45) Date of Patent: Jan. 20, 2015

(54) CORN HEAD ATTACHMENT WITH SWEEPER DEVICE

(71) Applicant: Carl Geringhoff GmbH & Co. KG, Ahlen (DE)

(72) Inventors: Klemens Surmann, Ahlen (DE); Andre Hemmesmann, Sassenberg (DE); Bernd Albinger, Bad Saulgau (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 329 days.

(21) Appl. No.: 13/623,138

(22) Filed: Sep. 20, 2012

(65) Prior Publication Data

US 2014/0075908 A1    Mar. 20, 2014

(30) Foreign Application Priority Data

Sep. 20, 2011   (DE) .......................... 10 2011 113 684

(51) Int. Cl.
*A01D 45/02*    (2006.01)

(52) U.S. Cl.
CPC .................................... *A01D 45/021* (2013.01)
USPC ........................................................... 56/119

(58) Field of Classification Search
USPC ......... 56/14.5, 14.6, 106, 119, 294, 364, 103, 56/112, 400, 502–505; 198/676; 15/80
See application file for complete search history.

(56) References Cited

U.S. PATENT DOCUMENTS

| 3,584,444 | A | * | 6/1971 | Sammann et al. ............... 56/119 |
| 3,742,687 | A | * | 7/1973 | Kalkwaf ......................... 56/119 |
| 4,476,667 | A | * | 10/1984 | Moss ............................. 56/119 |
| 4,967,544 | A | * | 11/1990 | Ziegler et al. ............. 56/10.2 R |
| 6,672,042 | B2 | | 1/2004 | Gengenbach |
| 7,377,091 | B2 | * | 5/2008 | Shelton et al. ................. 56/119 |

FOREIGN PATENT DOCUMENTS

DE      10 2006 029 608 A1    1/2008

* cited by examiner

*Primary Examiner* — Robert Pezzuto
(74) *Attorney, Agent, or Firm* — Gudrun E. Huckett (57) ABSTRACT

A corn head attachment has a sweeper device extending across a working width of the corn head attachment. The sweeper device is attached to the attachment frame by support arms pivotable about a first pivot. The sweeper device position relative to the frame is adjustable by a longitudinal adjusting device parallel to the travel direction and height-adjustable about the first pivots. The adjusting device moves the sweeper device along a curved path in a first direction away from a first position, in which a rotary axle of the sweeper device is at a leading area of a harvesting slot, into a second position above a rearward area of the harvesting slot and also moves the sweeper device in opposite direction. The adjustment of the sweeper device along the curved path is controlled by a forced guiding action to avoid collision of the sweeper device with other corn head attachment components.

12 Claims, 7 Drawing Sheets

CORN HEAD ATTACHMENT WITH SWEEPER DEVICE

BACKGROUND OF THE INVENTION

The present invention concerns a corn head attachment with a rotatably drivable sweeper device that extends transversely across the working width of the corn head attachment and is attached to at least two support arms that are pivotable about a pivot (axis of rotation), wherein a position of the sweeper device relative to the corn head attachment is adjustable by a longitudinal adjusting device parallel to the forward travel direction and is height-adjustable about a pivot (axis of rotation) by means of a pivot device.

A corn head attachment of the aforementioned kind that can be attached to a combine is disclosed in U.S. Pat. No. 6,672,042 B2. The sweeper device serves the purpose of sweeping away crop that collects and builds up on covers of conveying devices. The sweeper device is secured by two support arms that are pivotable for height adjustment about an axis of rotation. In order to be able to adjust the position of the sweeper device relative to the remainder of the corn head attachment in horizontal direction, each support arm is provided with a front section that can be pushed onto the remainder of the support arm and secured by cotter pins in various positions. Longitudinal adjustment is thus possible only manually with significant conversion labor when the combine is stopped. With this adjusting device, it is not possible to adapt the spatial position of the sweeper device in longitudinal direction to an actual harvesting situation while the combine is operating.

The publication DE 10 2006 029 608 A1 discloses an adjusting device for a reel of a grain platform in which the height adjustment is limited in order to avoid a collision of the reel with the driver cabin in case of particularly tall crop.

A motor-driven longitudinal adjustment of the reel is possible only along the straight support arms of the reel that, depending on the pivot position, are usually not parallel to the grain platform bottom. In order to maintain a desired height in case of a longitudinal adjustment of the reel, it is then necessary to readjust also the height adjustment of the reel in addition to the longitudinal adjustment.

SUMMARY OF THE INVENTION

It is an object of the present invention to improve the adjustability of the sweeper device.

The object is solved for a corn head attachment of the aforementioned kind in that the sweeper device, designed to be motor-actuated, is moveable along a curved path by means of a longitudinal adjusting device in a first direction away from a first position, in which the axis of rotation (rotary axle) of the sweeper device, viewed in the forward travel direction, is positioned in front of or above a leading area of a harvesting slot, into a second position that is located above a rearward area of the harvesting slot, and is moveable in a second direction in the opposite direction, wherein the adjustment movement along the curved path is controlled by a forced guiding action such that the sweeper device will not collide with other components of the corn head attachment during the adjustment movement.

By movement of the sweeper device along a curved path, it is possible to guide the sweeper device, on the one hand, in close proximity across the surface of other components of the corn head attachment so that almost all of the crop that has collected on the covers of the conveying devices can be reached by the sweeper device and swept away but, on the other hand, a collision with the corresponding covers is reliably prevented. Because of the motoric actuation, an adjustment is even possible during travel of the combine.

For the driver of a combine, the forced guiding action provides a significant improvement of the combine operation because the driver must simply move the sweeper device forwardly or rearwardly in order to remove from the corn head attachment the crop that is collecting. Because the driver, as the crop is building up, can often no longer see the surfaces of the components of the corn head attachment underneath, it would be very difficult for him to adjust the sweeper device in such a way that he can guide the sweeper device in close proximity across the surfaces of the components underneath without however causing a collision of the sweeper device with the components. An adjusting process would require full concentration of the driver and would cause him to be distracted from the actual harvesting process. Most likely, the adjusting process without the forced guiding action would have to be repeated several times because the driver for safety reasons would maintain too large a safety spacing of the sweeper device relative to the surfaces underneath and the sweeping result would therefore not be satisfactory.

As a result of the forced guiding action along a curved path, the sweeper device can be guided not only along a straight line but the sweeper device can also follow at the same time raised portions and steps in the surfaces of the covers in horizontal and vertical directions without the driver having to control this action. This is a decisive improvement in comparison to grain platforms because the cutting and conveying devices of a corn head attachment have a greater height and require a greater length in order to be able to carry out their harvesting function. Therefore, a coordination of the height and length adjustment of the sweeper device in case of a corn head attachment is much more difficult. As a result of the forced guiding action along a curved path, it is also possible to adjust the sweeper device to the front and downward to such an extent that the sweeper device reaches into the area immediately in front of the cutting members of the corn head attachment. For an adjusting range that extends so far forwardly and that includes the height steps of the surfaces of the covers of the conveying devices down to the cutting members close to the ground, the driver of the combine can sweep away the crop that is building up from the entire conveying stretch of the crop, from the cutting members to the transverse conveying auger, with a single adjusting movement of the sweeper device along the curved path, while the combine is operating.

Because of the forced guiding action along a curved path, the driver of the combine can adjust the sweeper device at any time in a direction that appears beneficial simply by actuating an operating button in a "forward" or "rearward" direction without having to worry about a possible collision with other components. The driver can thus spontaneously react to the actual harvesting situations by a simple push of a button and sweep the building-up crop quickly from the surfaces of the corn head attachment.

According to one embodiment of the invention, the curved path is designed to follow at a minimal spacing the contour of the surfaces of components of the corn head attachment that are positioned underneath the sweeper device. By the adjustment of the curved path to the contour of the surfaces, the operating members of the sweeper device can be guided in close proximity across the surfaces so that an excellent sweeping action of the crop collecting on the surfaces is possible. The smaller the spacing of the sweeper device relative to the surfaces, the better the sweeping result.

According to one embodiment of the invention, at least two support arms are pivotably connected to a respectively associated pivot arm by a pivot, and
- the pivot arm is connected with its first free end at a fastening point to the sweeper device and with its second free end by a pivot to a first end of the longitudinal adjusting device;
- the pivot by means of which the pivot arm is connected to the support arm is arranged between the fastening point of the sweeper device on the pivot arm and the pivot by means of which the pivot arm is connected to the longitudinal adjusting device;
- the pivot arm is connected by a pivot with a first end of a support element;
- a second end of the longitudinal adjusting device is connected by a pivot at a spacing to the pivot arm to the support arm and a second end of the support element is supported by a pivot at a spacing to the pivot arm on the frame of the corn head attachment; and the support arms that are connected to the pivot arms form in this way the forced guiding action along the curved path. Each support arm forms in the described way together with the associated pivot arm a multi-joint arrangement that, based on the spatial position of the support arm, of the pivot arm, and of the support element relative to each other as well as the respective positions of the individual pivots for actuation of the longitudinal adjusting device, produces a precisely defined resultant movement of the sweeper device. The described multi-joint arrangement forms a mechanical forced guiding action by means of which the sweeper device is movable always only along the movement path that is predetermined by the multi-joint arrangement. The length and the course of the movement path can be precisely defined by determining the corresponding geometries of the support arm, the pivot arm, and of the support element relative to each other as well as the respective positions of the individual pivots (axes of rotation). The multi-joint arrangement can be produced inexpensively and functions reliably, even under rough harvesting conditions with exposure to dirt and moisture.

According to one embodiment of the invention, the longitudinal adjusting device is designed to be motor-actuatable by only one hydraulic cylinder on a support arm. By use of a single hydraulic cylinder per support arm for an adjustment of the sweeper device in horizontal and vertical directions, the adjusting device is comparatively inexpensive and lightweight. Coordination of several drive actions for performing an adjusting movement by the driver or an automatic operating system is not required so that the complexity of the adjusting device is comparatively minimal. In case of possible functional failures, the longitudinal adjusting device that only has one hydraulic cylinder can be repaired more easily.

According to one embodiment of the invention, for lifting the sweeper device a second motoric drive that is independent of the longitudinal adjusting device is present. In individual situations, it may be desirable to move the sweeper device in upward direction away from the adjusted movement path, for example, in order to be able to reach, for maintenance and cleaning work, the harvesting slots more easily, to shut down the sweeper device, or to displace the movement path as a whole in upward direction. Since the longitudinal adjusting device has the purpose of moving the sweeper device along the predetermined movement path, it is advantageous to provide for a height adjustment of the sweeper device a second motoric drive that is independent of the longitudinal adjusting device. In this way, operation is facilitated.

According to one embodiment of the invention, the second motoric drive is a hydraulic cylinder that is connected by means of a pivot (axis of rotation) with the support element; the support element and/or the hydraulic cylinder are connected by means of a coupling rod to the support arm. In this solution, the sweeper device is pivoted by means of the pivot arm on which the support element engages. By means of the lever action of the pivot arm, greater pivot movements of the sweeper device can be effected with short adjusting strokes of the hydraulic cylinder. By means of the coupling rod that is connected to the support arm, the joint connection between the support element and the hydraulic cylinder can be stabilized so that it does not buckle under load.

According to one embodiment of the invention, at least two support arms each have a stationarily arranged connecting link with inner toothing that each mesh with a gear that is arranged fixedly on a stationary but rotatably arranged torsion shaft and the torsion shaft transmits by means of the two gears and the connecting link a pivot movement of one support arm onto the other support arm. By means of the torsion shaft, it is possible to ensure synchronization of the pivot movement of the support arms.

According to one embodiment of the invention, the spacing between the pivot (axis of rotation) where the pivot arm is connected to the support arm and the pivot (axis of rotation) where the pivot arm is connected to a first end of the longitudinal adjusting device is shorter than the spacing between the pivot (axis of rotation) where the pivot arm is connected to the support arm and the pivot (axis of rotation) where the pivot arm is connected to a first end of the support element. The different spacings result in a transmission ratio with which the pivot movement of the longitudinal adjusting device is converted into a longer adjusting stroke performed by the sweeper device. Due to the transmission ratio, the hydraulic cylinder can be shorter than the total length of the movement path.

According to one embodiment of the invention, the sweeper device has several sweeper elements that are connected fixedly with the rotary axle of the sweeper device wherein each sweeper element is provided with one or several fingers produced of a non-metallic material. By means of the narrow fingers it is possible to engage between the divider tips and the covers of the conveying means up to a point of close proximity relative to the cutting device and the harvesting slot and to remove from there the collected or built-up crop. By using a non-metallic material for the fingers, the fingers may have increased flexibility and elasticity. In case of force peaks, the fingers can deflect as a result of their flexibility and in this way they generate restoring forces by means of which they are returned after cancellation of the force into their original shape. When using plastics as the finger material, sticky crop has less of a tendency to adhere to the surfaces so that the fingers remain cleaner.

According to one embodiment of the invention, the finger or fingers have a curvature that trails behind in the rotational direction of the sweeper device. As a result of the trailing curvature, the fingers will not skewer the crop but push it gently across the entire length of the fingers with a force acting at a slant from above in the conveying direction. This reduces the risk that the crop could coil up at the sweeper device.

According to one embodiment of the invention, the sweeper elements are arranged on the rotary axle of the sweeper device so as to be slidable in transverse direction. Because of their lateral adjustability, the sweeper elements can be matched better to concrete harvesting conditions in particular when also the position of the harvesting slots on the corn head attachment is designed to be slidable in transverse direction.

According to one embodiment of the invention, the longitudinal adjusting device is driven by one or several servo motors. Electrical servo motors can be used instead of the hydraulic cylinders for the longitudinal adjustment of the sweeper device. Because in case of servo motors a rotary angle control and a position control can be realized easily by sensors, a multi-joint arrangement can be eliminated, depending on the design, by using servo motors. When using several servo motors, the servo motors can be coordinated by means of a common control device with respect to their movements such that, based on the coordinated movement of the servo motors, a movement path is generated that is dictated by the control device and along which the sweeper device moves.

It is expressly noted that the afore described embodiments of the invention can be combined individually but also with each other in any combination inasmuch as there are no contrary technical constraints.

Further modifications and embodiment details of the invention may be taken from the following description and the drawings.

BRIEF DESCRIPTION OF THE DRAWINGS

The afore described invention will be described in the following with the aid of one embodiment in more detail.

DESCRIPTION OF PREFERRED EMBODIMENTS

Figure 1:
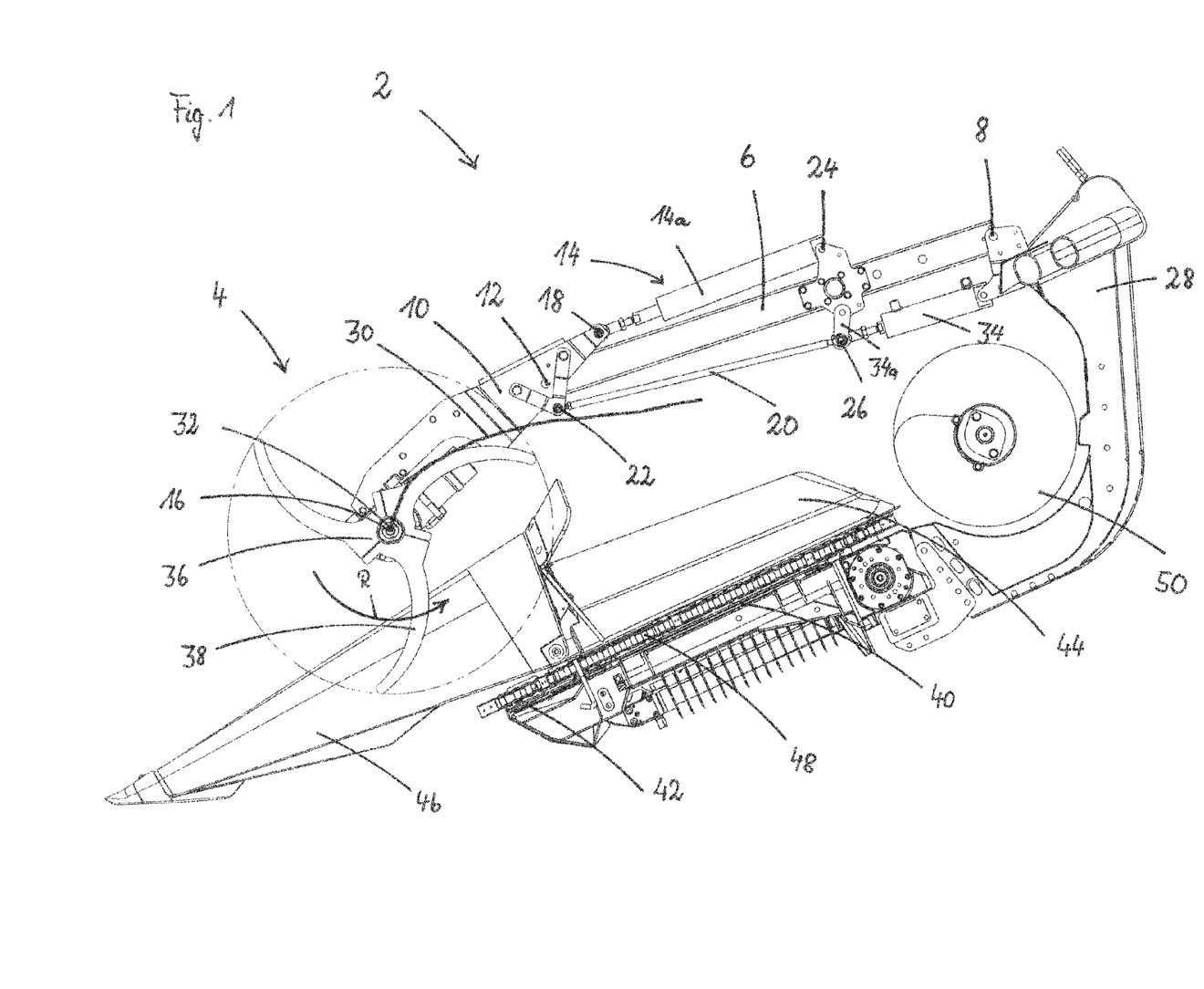
FIG. 1 shows a corn head attachment in a cross-sectional view.

In FIG. 1, a cross-sectional view of a corn head attachment 2 is shown. In the leading area of the corn head attachment 2 the sweeper device 4 is arranged and is secured by a support arm 6. The support arm 6 is pivotable about a pivot (axis of rotation) 8.

On the support arm 6, a pivot arm 10 is arranged that is mounted so as to be rotatable by means of pivot 12 on the support arm 6. To the pivot arm 10 a longitudinal adjusting device 14 is connected by means of which the sweeper device 4 is adjustable in longitudinal direction. The sweeper device 4 is attached at attachment point 16 to the pivot arm 10 and the longitudinal adjusting device, in the illustrated embodiment comprised of hydraulic cylinder 14a, is connected by pivot 18 to the pivot arm 10.

In the illustrated embodiment, the pivot arm 10 is supported on support element 20 that is connected with the pivot arm 10 by means of pivot 22. In the illustrated embodiment, the pivot 22 is connected to a fastening bracket that is connected fixedly with the pivot arm 10.

The longitudinal adjusting device 14 is connected by pivot 24 with the support arm 6 and is firmly supported. The pivot 24 is arranged in a console fixedly connected to the support arm 6. Relative to the frame 28, the support element 20 is supported by means of pivot 26 at the frame 28.

Upon actuation of the longitudinal adjusting device 14 (in the illustrated embodiment thus an extension or retraction of the hydraulic cylinder 14a), a movement along the curved path 30 results for rotary axle 32 of the sweeper device 4. The curved path 30 is the resultant movement of the combination of the size of the support arm 6, the pivot arm 10, the support element 20, and the movement impulse of the longitudinal adjusting device 14 as well as of the pivots that connect these machine elements and that together form the multi-joint arrangement. In case of an adjusting movement of the longitudinal adjusting device 14, the rotary axle 32, as a result of the multi-joint arrangement as a forced guiding action, always assumes a position that corresponds to a position on the curved path 30 associated with an extended position of the hydraulic cylinder 14.

By an adjusting movement along the curved path 30, it is possible to move the sweeper device 4, depending on its position, in a forward or rearward direction. Since the sweeper device 4 is driven in rotation, it can sweep away the crop that is collecting on the corn head attachment 2.

With a second hydraulic cylinder 34 it is possible in the illustrated embodiment to lift the support arm 6 as well as the sweeper device 4 connected thereto from the working position illustrated in FIG. 1 in upward direction. The hydraulic cylinder 34 is supported at its first end by a pivot on the frame 28 of the corn head attachment 2; the second end is connected by means of pivot 26 with the support element 20. When carrying out a telescoping movement, the hydraulic cylinder 34 forces by means of support element 20 the pivot arm 10 and the support arm 6, connected thereto by pivot 12, in upward direction.

In order to avoid upon adjusting movement of the hydraulic cylinder 34 buckling of the support element 20 about the pivot 26, the pivot 26 is connected by a coupling rod 34a with the support arm 6. The support element 20 is therefore maintained by coupling rod 34a at a defined spacing to the support arm 6.

The sweeper device 4 has a number of sweeper elements 36 which, in the illustrated embodiment, are formed as a rotary star. In the illustrated embodiment, the sweeper element 36 has three fingers 38 each that each have a curvature which trails or lags behind in rotational direction R of the sweeper device 4. Because of the curvature, the fingers 38 gently push crop lying on the surfaces of the corn head attachment 2 in the conveying direction upon rotational movement about rotary axle 32. Because of the trailing curvature, pickup and adhesion of the crop on the fingers 38 is avoided.

In the forward travel direction in front of the cutting zone 42 there are dividers 46 that, beginning at their leading tip, widen laterally and upwardly in order to push the corn stalks to be harvested into the harvesting slot. During harvest, the corn stalk is then first cut off by the cutting zone 42 arranged in the leading bottom area of the corn head attachment 2. Adjacent to the cutting zone, there is a harvesting slot 40 by means of which the stalk of the corn plant is then pulled downwardly by a snap roll arrangement located underneath, the ear being retained by lateral plates that delimit the harvesting slot 40 and thus being pulled off the stalk. The ears and leaves that have been stripped off the stalks and that collect above the harvesting slot and the covers 44 are normally entrained by sweepers that are connected to the gathering chains 48 and are conveyed in the direction of the conveying auger 50. However, with the aid of FIG. 1, it is easily apparent that, in case of very tall corn and down corn, plant parts may collect on the covers 44 that can no longer be gathered by the gathering chains 48 and the sweepers attached thereto. When more and more crop is collecting on the surfaces of the covers 44, the combine driver can no longer see clearly whether the corn head attachment 2 properly performs the harvesting work in the harvesting slots 44.

In order to clear in such harvesting conditions the surfaces of the corn head attachment 2 from crop that has collected thereat, the driver of the combine now has the possibility in accordance with the invention to move the sweeper device 4 along the harvesting slots 40 across the length of the corn head attachment 2. Based on the curved path 30 illustrated in FIG. 1, it is apparent that, when an adjusting movement beginning at the forward starting point is carried out, the rotary axle 32 of the sweeper device 4 is first moved primarily in upward direction in order to avoid a collision of the fingers 38 with the sweepers of the gathering chains 48 and the knives in the cutting zone 42 and the covers 44 that are covering these components. In this connection, the sweeper device 4 is however guided on the movement path 30 by a forced guiding action such that the fingers 38 of the sweeper elements 36 are always moving in close proximity to the surfaces of the components of the corn head attachment in a collision-free way. In this way, a very good sweeping action for the crop residues that are collecting on the surfaces of the corn head attachment 2 is provided. Upon movement of the rotating sweeper device 4 toward the conveying auger 50 the residues can be conveyed completely into the auger.

Figure 2:
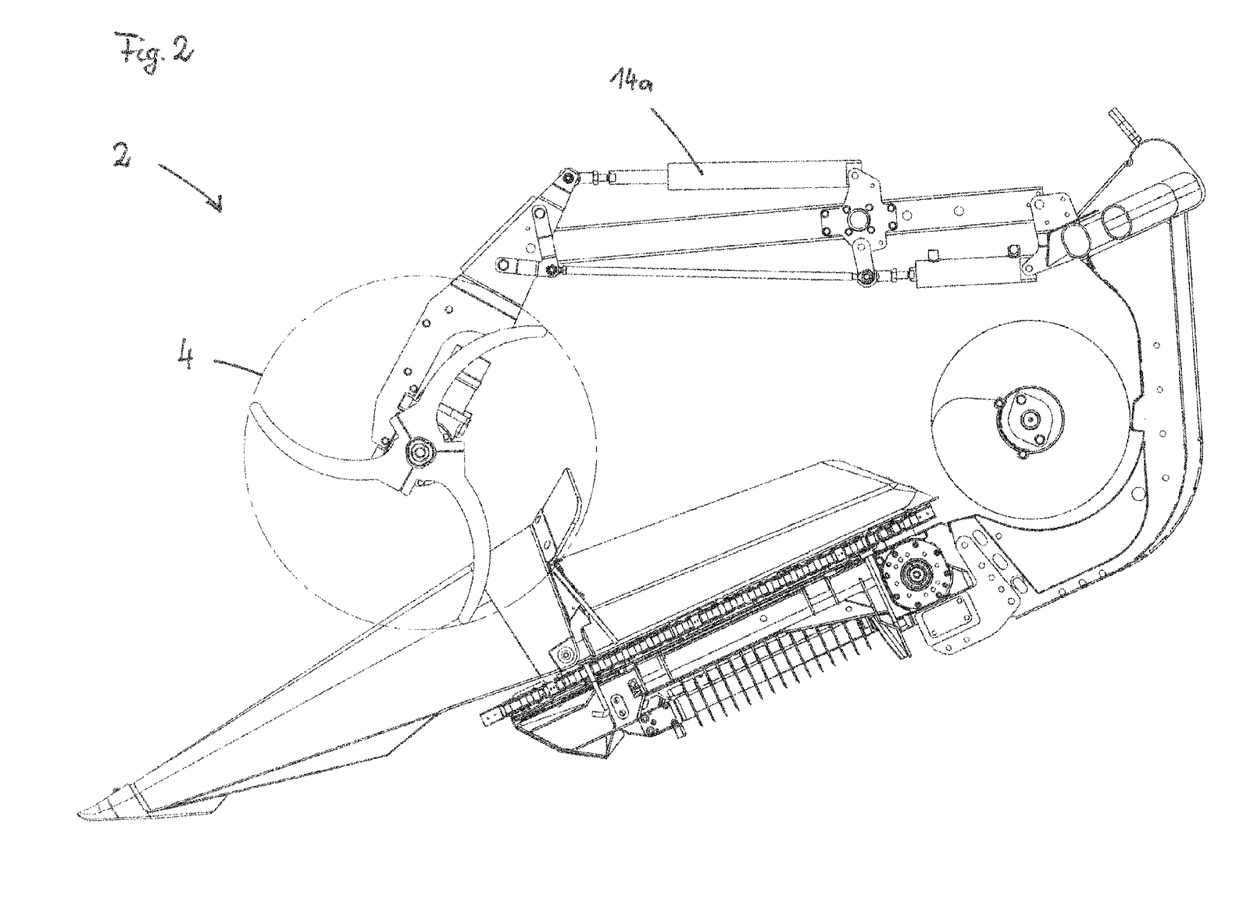
FIG. 2 shows the corn head attachment of FIG. 1 in a first adjusted position of the sweeper device.

In FIG. 2, an adjusting position is shown in which the piston rod of the hydraulic cylinder 14a has been moved a short distance away from its retracted end position illustrated in FIG. 1. The adjusting movement of the hydraulic cylinder 14a has caused a spatial position of the sweeper device 4 that, relative to FIG. 1, is raised and slightly moved to the rear relative to the forward travel direction. By means of the pivots 8, 12, 18, 22, 24, and 26, the components that together form the multi-joint arrangement (i.e., the longitudinal adjusting device 14 with the support arm 6, the pivot arm 10, and the support element 20) can adjust in a tension-free way to the new geometric conditions and move into their new spatial position.

Figure 3:
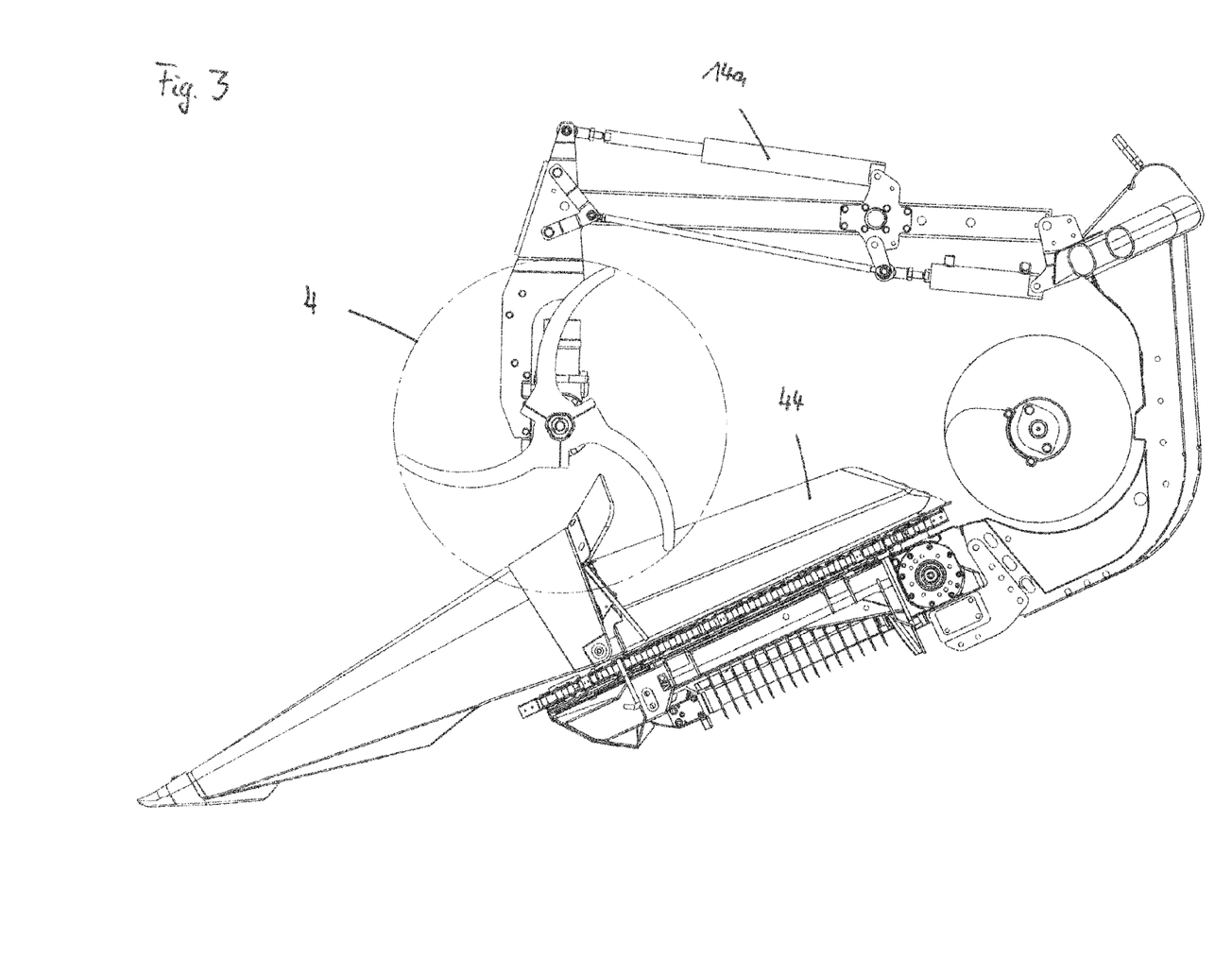
FIG. 3 shows the corn head attachment of FIG. 1 in a second adjusted position of the sweeper device.

In FIG. 3, the piston rod of the hydraulic cylinder 14a is shown in a position that relative to the position shown in FIG. 2 is father extended. The sweeper device 4 has been moved to the rear relative to the position of FIG. 2 toward the conveying auger 50. With its envelope curve, the sweeper device 4 has now reached approximately the center of the cover 44.

Because of the shape of the covers 44 that laterally slope downwardly toward the harvesting slots, the rotating sweeper elements 36 will not collide with the covers 44 but move into the intermediate space that is delimited laterally by the two neighboring covers 44 and is located above harvesting slots 40.

Figure 4:
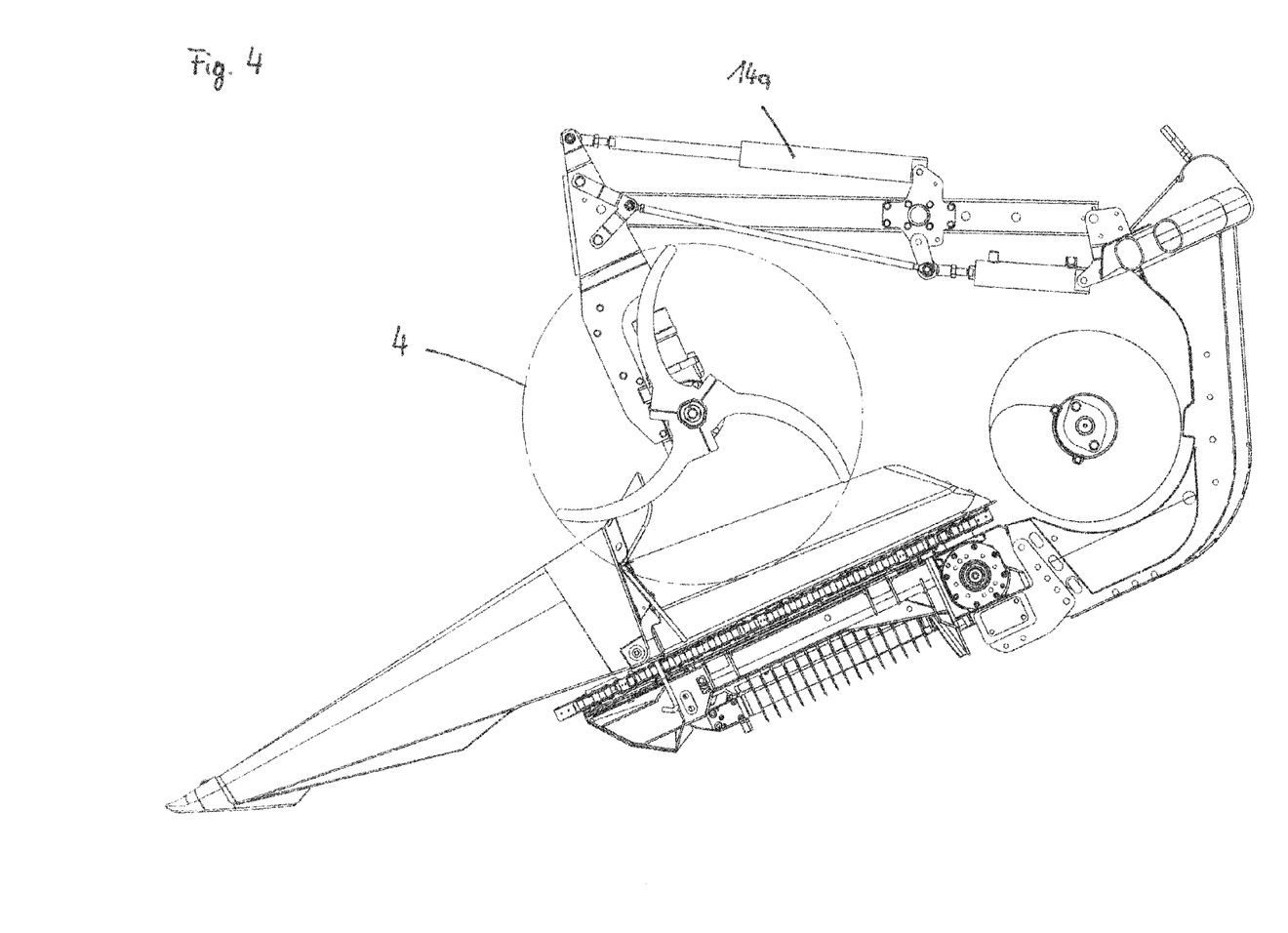
FIG. 4 shows the corn head attachment of FIG. 1 in a third adjusted position of the sweeper device.

In FIG. 4, the hydraulic cylinder 14a has been extended even father so that the sweeper device 4 has been moved even farther to the rear toward the conveying auger 50. In this position, the sweeper element 36 sweeps with its envelope curve almost across the entire length of a cover 44.

Figure 5:
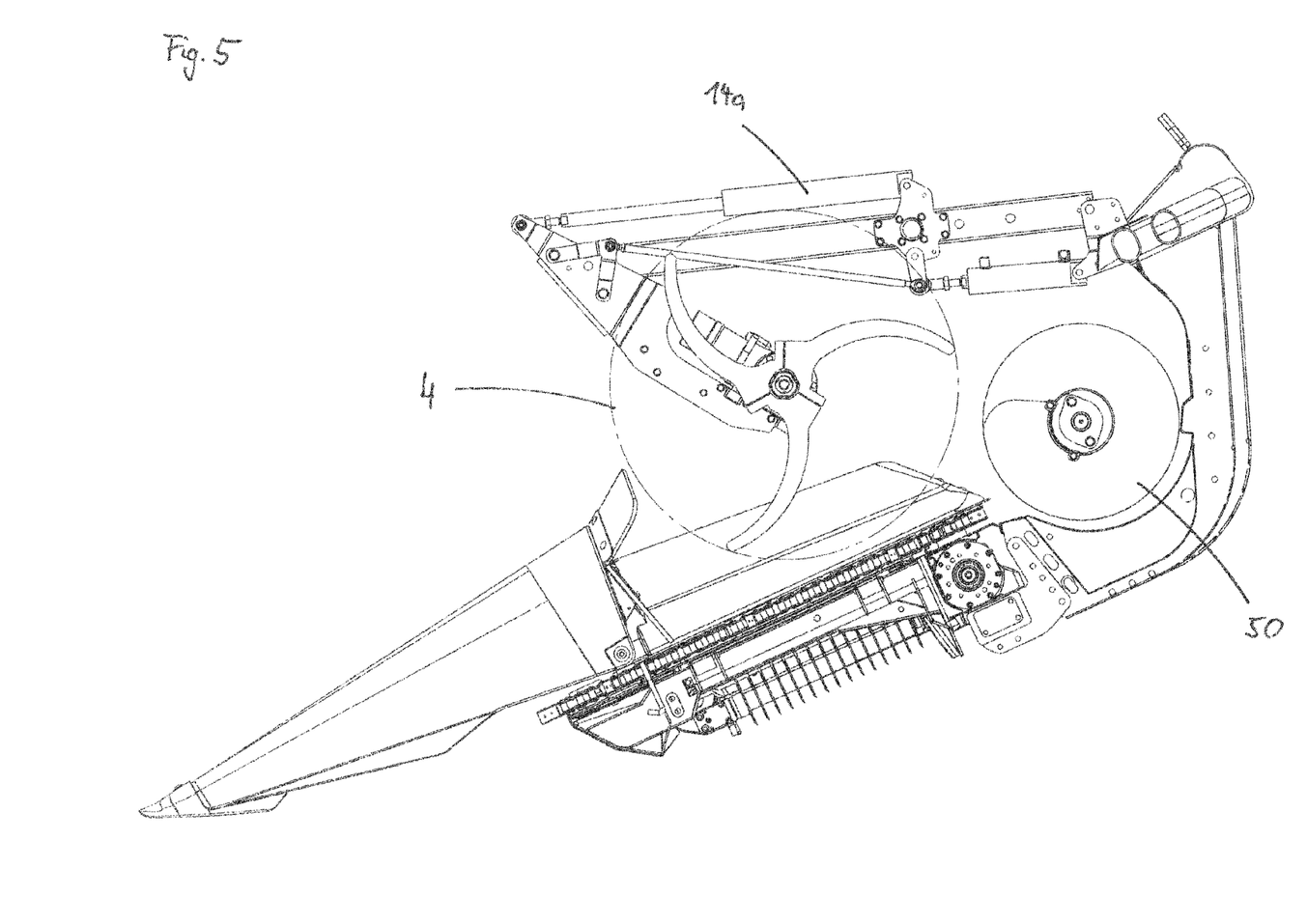
FIG. 5 shows the corn head attachment of FIG. 1 in a fourth adjusted position of the sweeper device.

In FIG. 5, the hydraulic cylinder 14a is now shown in its fully extended position. In this position, the sweeper device 4 has reached its end position. It can be seen clearly that the sweeper device 4 with the fingers 38 upon rotational movement of the sweeper element 36 will throw off crop that is located above the gathering chain 48 into the effective range of the conveying auger 50. In this way, a complete and reliable removal of the crop that is collecting on the corn head attachment 2 is ensured.

The curved path 30 that results from the configuration of the multi-joint arrangement in the illustrated embodiment is to be viewed only as an exemplary embodiment. By different dimensions or sizes of the components of the multi-joint arrangement as well as by a different spatial position of the pivots, a curved path 30 that deviates from that of the illustrated embodiment can be realized. Instead of the hydraulic cylinder 14a, a different actuating drive can be used also. For example, it is in particular also possible to employ instead of a hydraulic drive one or several electric servo motors.

In the illustrated embodiment, the curved path 30 extends almost across the entire length of the harvesting slot 40. The movement path can be selected to be shorter. In the illustrated embodiment, the curved path can begin at the leading area before the harvesting slot 40, but it can also begin above the harvesting slot 40. Moreover, the curved path 30 begins in the leading area of the corn head arrangement 2 so far downwardly that the lowermost point of the envelope curve of the fingers 38 is positioned approximately at the level of the cutting zone 42. The curved path 30 can also be designed such that the lowermost point of the envelope curve is still even below the cutting zone 42 but it may also be above it.

Figure 6:
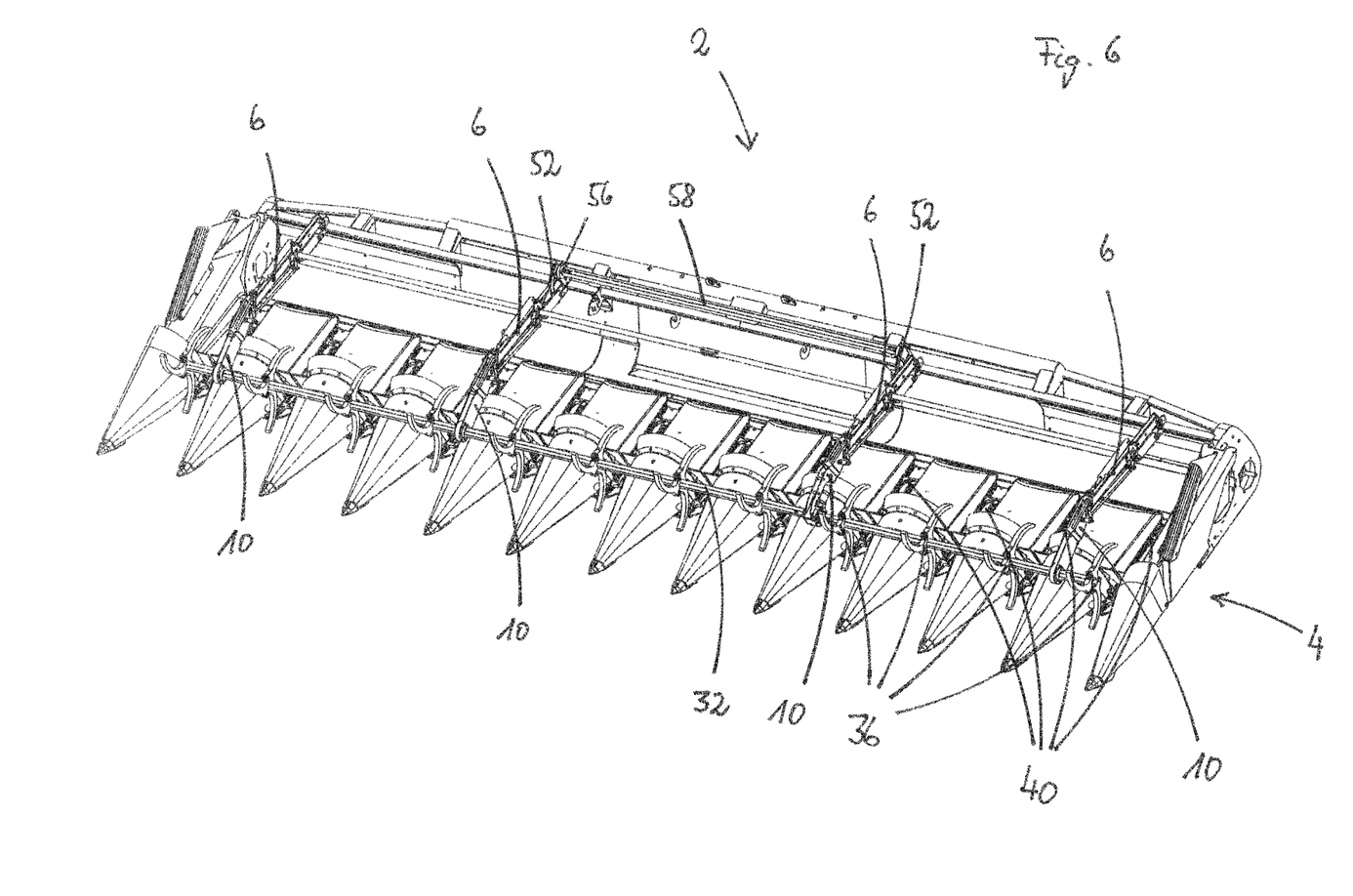
FIG. 6 shows a view from above at a slant onto a corn head attachment.

In FIG. 6, a view from above at a slant onto an exemplary corn head attachment 2 is shown. The corn head attachment 2 illustrated in FIG. 6 has a total of 12 harvesting slots that each have associated therewith a sweeper element 36. The sweeper elements 36 are arranged on the rotary axle 32 of the sweeper device 4. In the illustrated embodiment, the sweeper device 4 is supported by a total of four support arms 6, each having a pivot arm 10 attached thereto.

Since the sweeper device 4 in the position illustrated in FIG. 6 might impair cutting and pickup of corn stalks that are standing straight and upright, it is possible to move the sweeper device 4 either along the curved path 30 into a rearward position and/or to lift the sweeper device 4 upwardly in order to clear the inlet area for the corn plants into the effective area of the knives of the cutting zone 42.

Figure 7:
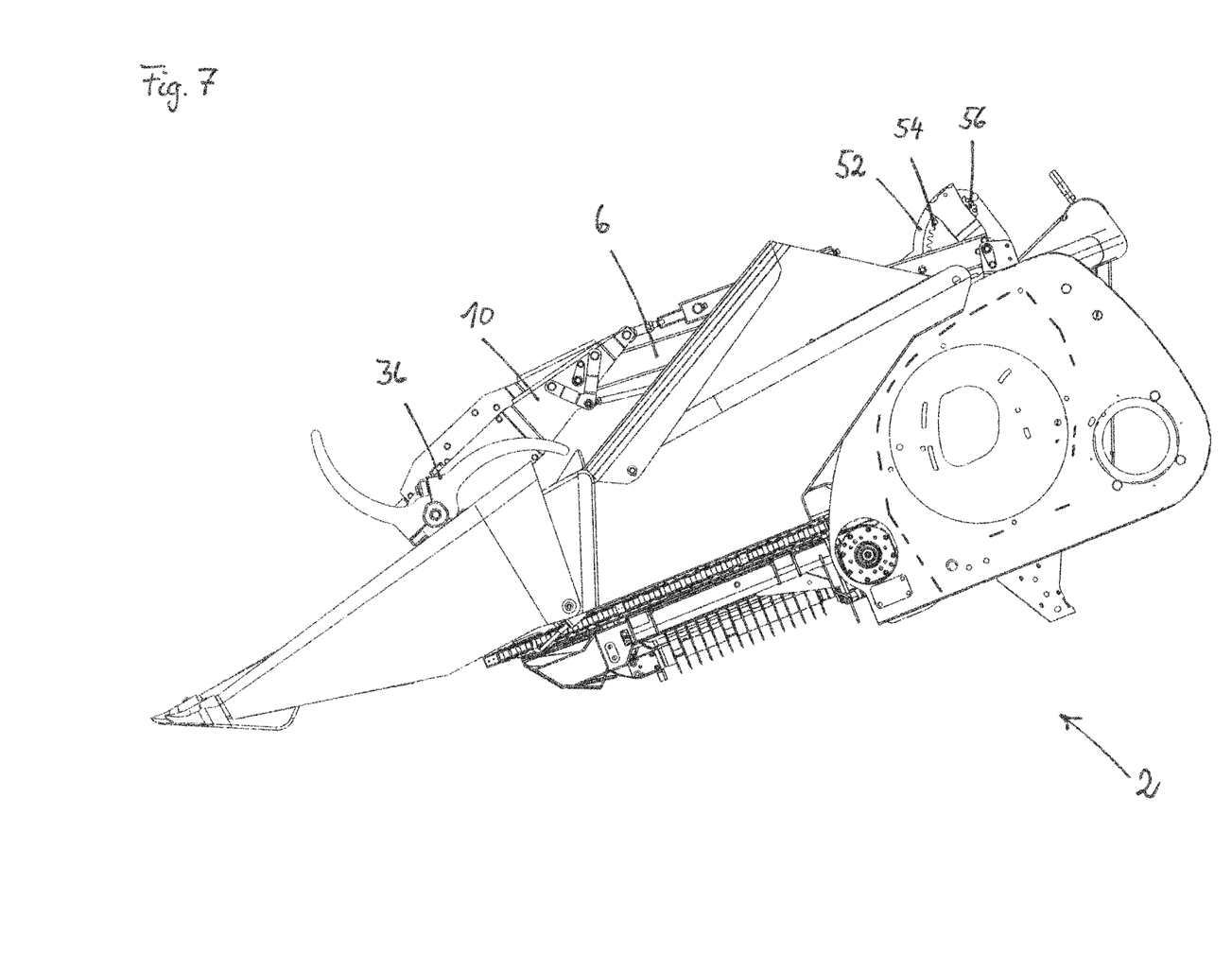
FIG. 7 is a side view of a corn head attachment.

In order to ensure synchronous operation of the four support arms 6 when carrying out a pivot movement, the two central support arms 6 are connected to each other by a synchronizing device that coordinates the pivot movement. The synchronizing device is comprised of connecting links 52 that are connected rigidly to the support arms 6 and mesh by means of an inner toothing 54 with a gear 56, respectively, that is arranged fixedly on the torsion shaft 58. The connecting links 52, the inner toothing 54, and the gear 56 are illustrated in the side view of the corn head attachment 2 shown in FIG. 7. When the support arms 6 are pivoted upwardly, the connecting links 52 with the inner toothing 54 is guided on the gear 56 that is caused to rotate in this way. This rotational movement is transmitted onto the torsion shaft 58. When speed differences result upon pivot movement of the support arms 6 that are connected to the torsion shaft 58, by means of the torsion shaft 58 and the gears 56 acting on the inner toothing 54 the support arm 6 that is moving too fast is slowed down and the support arm 6 that is moving too slow is accelerated so that forcibly a synchronous movement of the two support arms 6 is achieved. In this way, it is possible to ensure, even for a great working width of a corn head attachment 2, an identical pivot movement of all support arms 6.

The invention is not limited to the afore described embodiment. To a person of skill in the art, it is easily possible to modify the illustrated embodiment in a suitable way by adapting components with respect to a concrete application situation.

The specification incorporates by reference the entire disclosure of German priority document 10 2011 113 684.7 having a filing date of Sep. 20, 2011.

While specific embodiments of the invention have been shown and described in detail to illustrate the inventive principles, it will be understood that the invention may be embodied otherwise without departing from such principles.

What is claimed is:

1. A corn head attachment comprising:
   a frame;
   a rotatably drivable sweeper device that extends in a transverse direction of the corn head attachment transversely across a working width of the corn head attachment and is attached to the frame by at least two support arms that are pivotable about a first pivot, respectively;
   wherein a position of the sweeper device relative to the frame of corn head attachment is adjustable by a longitudinal adjusting device parallel to a forward travel direction and is height-adjustable about the first pivots;
   wherein the longitudinal adjusting device is motor-actuatable;
   wherein the longitudinal adjusting device is adapted to move the sweeper device along a curved path in a first direction away from a first position, in which a rotary axle of the sweeper device, viewed in the forward travel direction, is positioned in front of or above a leading area of a harvesting slot of the corn head attachment, into a second position that is located above a rearward area of the harvesting slot;
   wherein the longitudinal adjusting device is adapted to move the sweeper device in a second direction that is opposite to the first direction;
   wherein an adjustment movement of the sweeper device along the curved path is controlled by a forced guiding action such that the sweeper device cannot collide with components of the corn head attachment during the adjustment movement.

2. The corn head attachment according to claim 1, wherein the curved path is designed to follow a contour of surfaces of components of the corn head attachment located underneath the sweeper device so as to follow the contour at a minimal spacing.

3. The corn head attachment according to claim 1, wherein the at least two support arms each are connected pivotably by a second pivot with a pivot arm, respectively, and wherein
   the pivot arm has a first free end connected at a fastening point to the sweeper device and has a second free end connected by a third pivot to a first end of the longitudinal adjusting device;
   the second pivot is arranged between the fastening point of the sweeper device on the pivot arm and the third pivot;
   the pivot arm is connected by a fourth pivot with a first end of a support element;
   a second end of the longitudinal adjusting device is supported by a fifth pivot at a spacing to the pivot arm on the support arm and a second end of the support element is supported by a sixth pivot at a spacing to the pivot arm on the frame of the corn head attachment; and
   the support arms together with the pivot arms provide a forced guiding action along the curved path.

4. The corn head attachment according to claim 3, wherein the longitudinal adjusting device comprises a single hydraulic cylinder acting on one of the at least two support arms and is motor-actuatable.

5. The corn head attachment according to claim 3, comprising a motoric drive acting on the sweeper device for lifting the sweeper device, wherein the motoric drive is actuatable independent of the longitudinal adjusting device.

6. The corn head attachment according to claim 5, wherein the motoric drive is a hydraulic cylinder that is connected by the sixth pivot to the support element, wherein at least one of the support element and the hydraulic cylinder is connected with a coupling rod to the support arm.

7. The corn head attachment according to claim 1, comprising a stationary but rotatably arranged torsion shaft mounted on the frame, wherein the at least two support arms each are provided with a stationarily arranged connecting link with an inner toothing each meshing with a gear that is arranged fixedly on the torsion shaft, wherein the torsion shaft, by action of the gears and the connecting links, transmits a pivot movement of one support arm onto the other support arm.

8. The corn head attachment according to claim 3, wherein a spacing between the second pivot and the third pivot is shorter than a distance between the second pivot and the fourth pivot.

9. The corn head attachment according to claim 1, wherein the sweeper device has sweeper elements that are connected fixedly to a rotary axle of the sweeper device, wherein the sweeper elements each comprise one or several fingers produced from a non-metallic material.

10. The corn head attachment according to claim 9, wherein the finger or fingers have a curvature that is trailing in a rotational direction of the sweeper device.

11. The corn head attachment according to claim 9, wherein the sweeper elements are connected with the rotary axle of the sweeper device so as to be slidable in the transverse direction of the corn head attachment.

12. The corn head attachment according to claim 1, wherein the longitudinal adjusting device is driven by one or several servo motors.

* * * * *